US012596750B2

(12) United States Patent
Ren et al.

(10) Patent No.: US 12,596,750 B2
(45) Date of Patent: Apr. 7, 2026

(54) PARTITION PRUNING BY FUNCTION

(71) Applicant: SAP SE, Walldorf (DE)

(72) Inventors: Qingwei Ren, Xian (CN); Zhe Qu, Xian (CN); Zhilong Hao, Xian (CN); Weimin Qi, Xian (CN); Long Zhang, Xian (CN); Jiaxin Liu, Xian (CN); Xiaoke Liu, Xian (CN); Xiaolong Yang, Xian (CN)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 17/512,375

(22) Filed: Oct. 27, 2021

(65) Prior Publication Data

US 2023/0126103 A1      Apr. 27, 2023

(51) Int. Cl.
*G06F 16/903*       (2019.01)
*G06F 16/901*       (2019.01)

(52) U.S. Cl.
CPC .... *G06F 16/90335* (2019.01); *G06F 16/9017* (2019.01)

(58) Field of Classification Search
CPC ........................ G06F 16/90335; G06F 16/9017
See application file for complete search history.

(56) References Cited

U.S. PATENT DOCUMENTS 11,526,504 B1 * 12/2022 Moshgabadi ......... G06F 16/245
2002/0194157 A1 * 12/2002 Zait .................... G06F 16/2264

2006/0253429 A1 * 11/2006 Raghavan ......... G06F 16/24557
2011/0029557 A1 * 2/2011 Raghavan ......... G06F 16/24557
                                                                  707/769
2015/0286681 A1 * 10/2015 Baer ................... G06F 16/2282
                                                                  707/754
2016/0140174 A1 * 5/2016 Weyerhaeuser .. G06F 16/24542
                                                                  707/718
2016/0350392 A1 * 12/2016 Rice ..................... G06F 16/278
2017/0052989 A1 * 2/2017 Bensberg ............ G06F 16/2282
2019/0087457 A1 * 3/2019 Bellamkonda .... G06F 16/24553
2019/0236192 A1 * 8/2019 Zou ..................... G06F 16/2282
2020/0322159 A1 * 10/2020 Xu ........................ H04L 9/3236

* cited by examiner

*Primary Examiner* — Taelor Kim

(74) *Attorney, Agent, or Firm* — Mintz Levin Cohn Ferris Glovsky and Popeo, P.C.

(57)                 ABSTRACT

A method for processing a query may include evaluating a query on a database table to identify a time based function included in the query. One or more partitions of the database table may be pruned from the query based at least on the partitions being associated with a first time range that does not overlap with a second time range associated with the time based function. An execution plan for the query may be generated to include a sequence of operations that avoids accessing the one or more partitions pruned from the query. The query may be executed based at least on the execution plan by at least accessing a second partition of the database table but not the first partition of the database table pruned from the query. Related systems and articles of manufacture are also provided.

13 Claims, 4 Drawing Sheets

150

| Column 1 | Column 2 |
|---|---|
| 2008-06-10 | 335305910 |
| 2002-01-12 | 503105 |
| 2004-09-04 | 15010682015 |
| ... | ... |

Partition 155a

| Column 1 | Column 2 |
|---|---|
| 2015-07-01 | 60780160 |
| 2015-05-31 | 4058106 |
| 2019-02-04 | 9106840681 |
| ... | ... |

Partition 155b

| Column 1 | Column 2 |
|---|---|
| 1999-06-10 | 77563810 |
| 2021-01-12 | 3591961068 |
| 2020-09-04 | 15010682015 |
| ... | ... |

Partition 155c

150

Partition 155a

| Column 1 | Column 2 |
|---|---|
| 2008-06-10 | 335305910 |
| 2002-01-12 | 503105 |
| 2004-09-04 | 15010682015 |
| ... | ... |

Partition 155b

| Column 1 | Column 2 |
|---|---|
| 2015-07-01 | 60780160 |
| 2015-05-31 | 4058106 |
| 2019-02-04 | 9106840681 |
| ... | ... |

Partition 155c

| Column 1 | Column 2 |
|---|---|
| 1999-06-10 | 77563810 |
| 2021-01-12 | 3591961068 |
| 2020-09-04 | 15010682015 |
| ... | ... |

FIG. 2

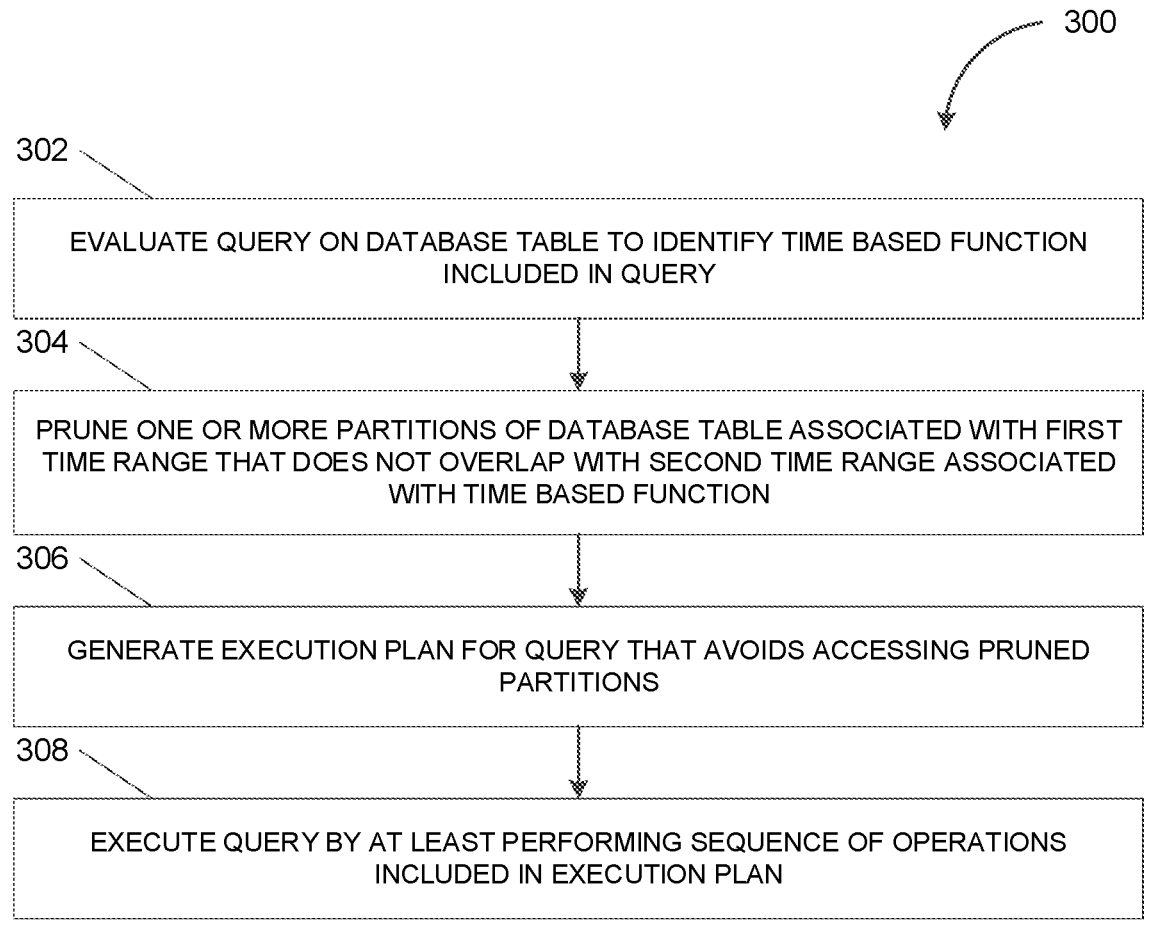

300

302

EVALUATE QUERY ON DATABASE TABLE TO IDENTIFY TIME BASED FUNCTION INCLUDED IN QUERY

304

PRUNE ONE OR MORE PARTITIONS OF DATABASE TABLE ASSOCIATED WITH FIRST TIME RANGE THAT DOES NOT OVERLAP WITH SECOND TIME RANGE ASSOCIATED WITH TIME BASED FUNCTION

306

GENERATE EXECUTION PLAN FOR QUERY THAT AVOIDS ACCESSING PRUNED PARTITIONS

308

EXECUTE QUERY BY AT LEAST PERFORMING SEQUENCE OF OPERATIONS INCLUDED IN EXECUTION PLAN

FIG. 3

PARTITION PRUNING BY FUNCTION

TECHNICAL FIELD

The subject matter described herein relates generally to database processing and more specifically to partition pruning for query processing.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for processing a query. In some example embodiments, there is provided a system that includes at least one processor and at least one memory. The at least one memory may include program code that provides operations when executed by the at least one processor. The operations may include: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

In some variations, one or more features disclosed herein including the following features can optionally be included in any feasible combination. The database table may include at least one column defined to store values having a time based datatype.

In some variations, the database table may be range partitioned, based at least on the values store in the at least one column, into the first partition and the second partition.

In some variations, the second partition may not pruned from the query in response to determining that a third time range of the second partition overlaps with the second time range of the time based function.

In some variations, the second partition may not pruned from the query in response to determining that the second time range associated with the time based function overlaps with one or more partition boundaries of the second partition.

In some variations, the time based function may be configured to select, from the database table, one or more rows based at least on the values occupying the at least one column.

In some variations, the time based function may define a time range comprising one or more years, months, or hours. The one or more rows may be selected from the database table based at least on the values occupying the at least one column being within the time range.

In some variations, the first time range associated with the first partition may include one or more years, months, and/or hours.

In some variations, the operations may further include: generating an execution plan for the query, the execution plan including a sequence of operations that avoids accessing the first partition pruned from the query.

In some variations, the sequence of operations may access a first node of a distributed database system storing a second partition of the database table but not a second node of the distributed database system storing the first partition of the database table.

In another aspect, there is provided a method for processing a query. The method may include: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

In some variations, one or more features disclosed herein including the following features can optionally be included in any feasible combination. The database table may include at least one column defined to store values having a time based datatype.

In some variations, the database table may be range partitioned, based at least on the values store in the at least one column, into the first partition and the second partition.

In some variations, the second partition may not pruned from the query in response to determining that a third time range of the second partition overlaps with the second time range of the time based function.

In some variations, the second partition may not pruned from the query in response to determining that the second time range associated with the time based function overlaps with one or more partition boundaries of the second partition.

In some variations, the time based function may be configured to select, from the database table, one or more rows based at least on the values occupying the at least one column.

In some variations, the time based function may define a time range comprising one or more years, months, or hours. The one or more rows may be selected from the database table based at least on the values occupying the at least one column being within the time range.

In some variations, the first time range associated with the first partition may include one or more years, months, and/or hours.

In some variations, the method may further include: generating an execution plan for the query, the execution plan including a sequence of operations that avoids accessing the first partition pruned from the query. The sequence of operations may access a first node of a distributed database system storing a second partition of the database table but not a second node of the distributed database system storing the first partition of the database table.

In another aspect, there is provided a computer program product including a non-transitory computer readable medium storing instructions. The instructions may cause operations may executed by at least one data processor. The operations may include: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to query processing in an in-memory database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 2 depicts an example of a partitioned database table, in accordance with some example embodiments;

FIG. 3 depicts a flowchart illustrating an example of a process for processing a query, in accordance with some example embodiments.

When practical, similar reference numbers denote similar structures, features, or elements.

DETAILED DESCRIPTION

Figure 1:
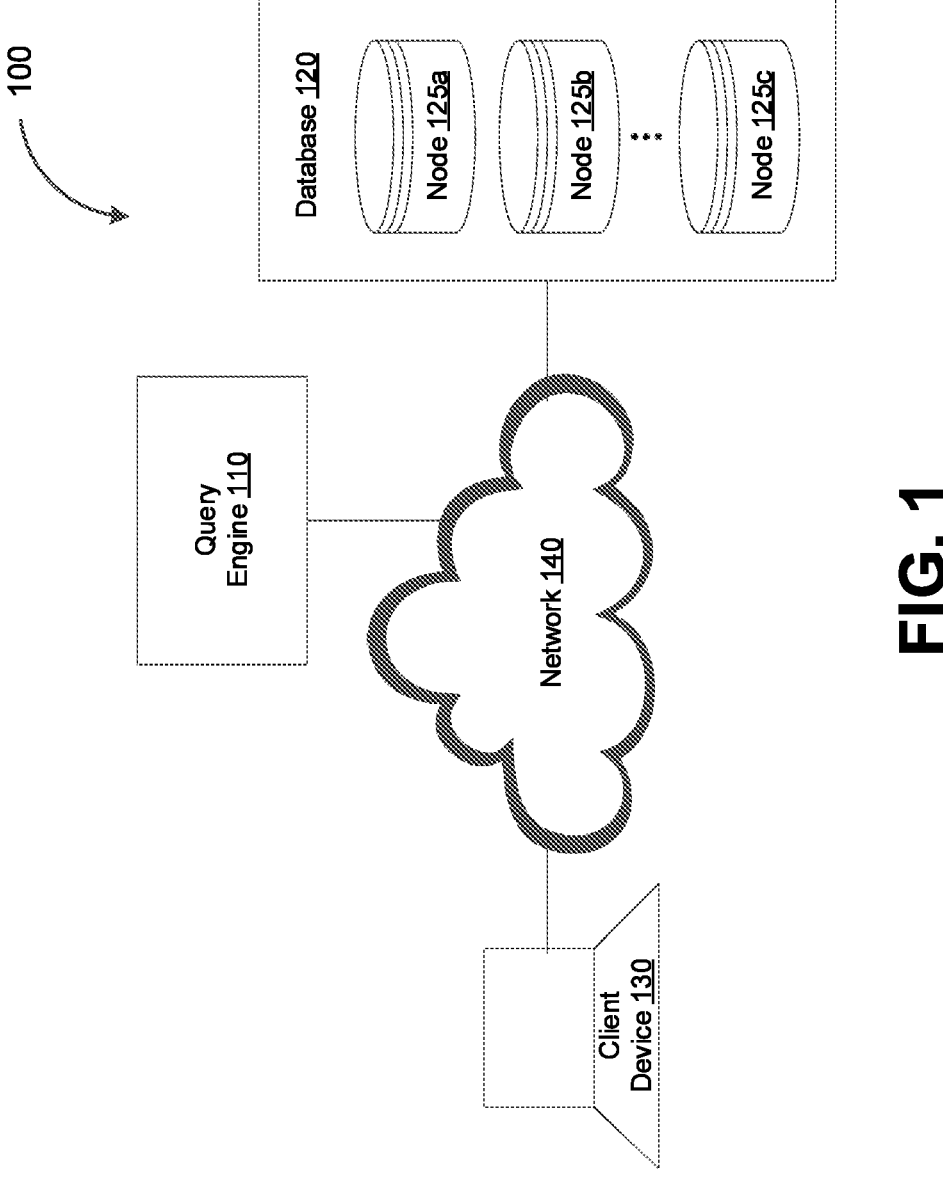
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, the tuples of a relation may occupy the rows of a database table while the columns of the database table may store the values of the common attributes shared by the tuples. Thus, in the columnar database, the values occupying each column of the database table, which may span multiple rows (or tuples) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. For example, a single database table may be divided into multiple partitions (or internal tables) and stored across multiple computing nodes. Data from the database table may be distributed across the partitions in a variety of manner. With hash partitioning, for example, each row of the database table may be assigned to a partition based on the hash value of the data occupying one or more columns identified as the partitioning columns. In round-robin partitioning, the rows of the database table are assigned to the partitions on a rotation basis. In the case of range partitioning, each partition may be associated with certain values or ranges of values and each row of the database tables may be assigned to a partition based on the data occupying the one or more partitioning columns being within the range of values associated with the partition. In some cases, the distribution of data may be performed based on various combinations of hash partitioning, round-robin partitioning, and range partition such as hash-range partitioning, round-robin range partitioning, and range-range partitioning.

A query on a database table that is divided into multiple partitions may be executed on multiple partitions, each of which being stored on a different computing node. However, a naïve approach that indiscriminately executes the query on every partition of the database table may reduce the speed and computational efficiency of the query. As such, in some example embodiments, a query engine may be configured to prune, from a query on a database table, one or more partitions of the database table holding data not required by the query. For example, the database table may be subjected to a range partitioning in which each partition of the database table corresponds to a time range such as year, month, hour, and/or the like. Meanwhile, a query on the database table may include a time based function that defines a time range including, for example, a year (or range of years), a month (or range of months), an hour (or range of hours), and/or the like. The query may be pruned based on the time based function to avoid executing the query on partitions that are outside of the time (or time range) defined by the time based function. For instance, a partition may be pruned from the execution of the query if the boundaries of the partition do not overlap with the range defined by the function.

FIG. 1 depicts a system diagram illustrating an example of a database system 100, in accordance with some example embodiments. Referring to FIG. 1, the database system 100 may include a query engine 110, a database 120, and a client device 130. As shown in FIG. 1, the query engine 110, the database 120, and the client device 130 may be communicatively coupled via a network 140. The database 120 may be a relational database including, for example, an in-memory database, a column-based database, a row-based database, and/or the like. The client device 130 can be a processor-based device including, for example, a mobile device, a wearable apparatus, a personal computer, a workstation, an Internet-of-Things (IoT) appliance, and/or the like. The network 140 may be a wired network and/or a wireless network including, for example, a public land mobile network (PLMN), a local area network (LAN), a virtual local area network (VLAN), a wide area network (WAN), the Internet, and/or the like.

The database 120 may be a distributed database in which the processing and storage of data is distributed across multiple computing nodes including, for example, a first node 125a, a second node 125b, a third node 125c, and/or the like. A database table 150 may be divided into multiple partitions by applying one or more of a hash partitioning, round-robin partitioning, and range partitioning. For example, the database table 150 may be divided into a first partition 155a, a second partition 155b, and a third partition 155c. Moreover, in the example shown in FIG. 1, the first partition 155a may be stored at the first node 125a, the second partition 155b may be stored at the second node 125b, and the third partition 155c may be stored at the third node 125c.

The query engine 110 may receive, from the client device 130, a query for execution at the database 120. In response to receiving the query from the client device 130, the query engine 110 may generate, for the query, an execution plan with a sequence of operations for executing the query. Moreover, the query engine 110 may execute, based at least on the execution plan, the query.

If the query is on a partitioned database table such as the database table 150, the execution plan may include operaquery, one or more partitions of the database table 150 with data not required by the query.

To further illustrate, the structured query language (SQL) CREATE TABLE statement below may define the database table 150 to include a first column $C_1$ occupied by values having a time based datatype such as a time datatype, a date datatype, a smalldatetime datatype, a datetime datatype, a datetime2 datatype, a datetimeoffset datatype, and/or the like.

---

CREATE TABLE T1 (C1 DATE, C2 INT) PARTITION BY RANGE (YEAR(C1)) (PARTITION 2000 <= VALUES < 2010, PARTITION 2010 <= VALUES < 2020, PARTITION OTHERS)

---

Table 1 below depicts some examples of time based datatypes and their corresponding characteristics. In this example, the SQL statement may define a second column $C_2$ occupied by values having the datatype INT (e.g., an integer value), although the database table 150 may be defined to include any quantity of columns occupied by a variety of other datatypes. The SQL statement may further partition the database table 150 into multiple partitions based on the values occupying the first column $C_1$. For example, the first partition 155a may be defined include rows in which the values occupying the first column $C_1$ is within a first range $R_1$ between the year 2000 and the year 2009 and the second partition 155b may be defined to include rows in which the values occupying the first column $C_1$ is within a second range $R_2$ between the year 2010 and 2020. Moreover, the third partition 155c of the database table 150 may be defined to include a third range $R_3$, which in this example includes rows with all other values occupying the first column $C_1$. That is, the third partition 155c of the database table 150 may include rows in which the values occupying the first column $C_1$ is within neither the first range $R_1$ nor the second range $R_2$. An example of the database table 150 defined by the CREATE TABLE statement is shown in FIG. 2.

TABLE 1

| Data type | Format | Range | Accuracy | Storage size (bytes) |
|---|---|---|---|---|
| time | hh: mm: ss [.nnnnnnn] | 00:00:00.0000000 through 23'59 59 9999999 | 100 nano-seconds | 3 to 5 |
| date | YYYY-MM-DD | 0001-01-01 through 9999-12-31 | 1 day | 3 |
| smalldatetime | YYYY-MM-DD hh:mm:ss | 1900-01-01 through 2079-06-06 | 1 minute | 4 |
| datetime | YYYY-MM-DD hh:mm:ss[.nnn] | 1753-01-01 through 9999-12-31 | 0.00333 second | 8 |
| datetime2 | YYYY-MM-DD hh:mm:ss [.nnnnnnn] | 0001-01-01 00:00:00.0000000 through 9999-12-31 23:59:59.9999999 | 100 nano-seconds | 6 to 8 |
| datetimeoffset | YYYY-MM-DD hh:mm:ss [.nnnnnnn] [+l–]hh:mm | 0001-01-01 00:00:00.0000000 through 9999-12-31 23:59:59.9999999 (in UTC) | 100 nano-seconds | 8 to 10 | tions on one or more of the first partition 155a at the first node 125a, the second partition 155b at the second node 125b, and the third partition 155c at the third node 125c. In this case, a naïve approach that indiscriminately executes the query on every partition of the database table 150 may reduce the speed and computational efficiency of the query. As such, in some example embodiments, the query engine 110 may prune, from the execution plan generated for the The query on the database table 150 may include a time based function that defines a time or a time range including, for example, a year (or range of years), a month (or range of months), an hour (or range of hours), and/or the like. In some example embodiments, the query engine 110 may prune the query on the database table 150 based on the time based function to avoid executing the query on partitions that are outside of the time (or time range) defined by the time based function. For example, the query on the database table 150 may include the time based function YEAR that defines a specific year (e.g., YEAR(C1)=2015) or a range of years (e.g., YEAR(C1)>2000).

Alternatively and/or additionally, the query on the database table 150 may include the time based function MONTH that defines a specific month (e.g., MONTH(C1)=1) or a range of months (e.g., MONTH(C1)<3) within any year. As such, the function MONTH(C1)=1 selects rows of data from the database table 150 in which the values occupying the first column $C_1$ equal the month January of any year while the function MONTH(C1)<3 selects rows of data from the database table 150 in which the values occupying the first column $C_1$ are within the months January and February of any year.

Alternatively and/or additionally, the query on the database table 150 may include the time based function HOUR that defines a specific hour (e.g., HOUR(C1)=2) or a range of hours (e.g., HOUR(C1)<2) within any month and any year. As such, the function HOUR(C1)=2 selects rows of data from the database table 150 in which the values occupying the first column $C_1$ is between 2 AM and 3 AM while the function HOUR(C1)<2 selects rows of data from the database table 150 in which the values occupying the first column $C_1$ are between midnight and 2 AM.

In some example embodiments, the query engine 110 may prune the query received from the client device 130 by evaluating the query to identify one or more time based functions such as YEAR( ) MONTH( ) and HOUR( ) Moreover, the query engine 110 may determine whether to prune one or more partitions of the database table 150 including, for example, the first partition 155a, the second partition 155b, the third partition 155c, and/or the like. For example, the query engine 110 may evaluate the boundaries of each partition to determine whether the time (or time range) defined by the time based functions are within the time (or time range) associated with each partition of the database table 150 such as, for example, the first range $R_1$ associated with the first partition 155a, the second range $R_2$ associated with the second partition 155b, the third range $R_3$ associated with the third partition 155c, and/or the like.

In some example embodiments, a partition may be pruned from the query if the query engine 110 detects an overlap between one or more boundaries of the partition and the time (or time range) defined by the one or more time based functions included in the query. For example, if the query includes the time based function YEAR(C1)=2015, the query engine 110 may prune the first partition 155a defined to cover the first range $R_1$ between the year 2000 and the year 2009 because the year 2015 is outside of the first range $R_1$. The query engine 110 may also prune the third partition 155c, which is defined to cover any values that are outside of the first range $R_1$ and the second range $R_2$, because the year 2015 is within the second range $R_2$. In doing so, the query engine 110 may exclude the first partition 155a and the third partition 155b from the execution plan generated for the query such that the query is executed without accessing the first partition 155a and the third partition 155b.

FIG. 3 depicts a flowchart illustrating an example of a process 300 for processing a query, in accordance with some example embodiments. Referring to FIGS. 1-3, the process 300 may be performed by the query engine 110 to execute a query on the database table 150 stored at the database 120. Data from the database table 150 may be range partitioned into, for example, the first partition 155a, the second partition 155b, and the third partition 155c. Moreover, the first partition 155a may be stored at the first node 125a, the second partition 155b may be stored at the second node 125b, and the third partition 155c may be stored at the third node 125c. As such, executing the query on the database table 150 may include executing the query on one or more partitions of the database table 150.

At 302, the query engine 110 may evaluate a query on a database table to identify a time based function included in the query. For example, the query engine 110 may receive, from the client device 130, a query on the database table 150, which may be range partitioned to include the first partition 155a covering the first range $R_1$ (e.g., between the year 2000 and the year 2010), the second partition 155b covering the second range $R_2$ (e.g., between the year 2010 and the year 2020), and the third partition 155c covering the third range $R_3$ (e.g., any value not within the first range $R_1$ and the second range $R_2$). The query engine 110 may evaluate the query to identify one or more time based functions including, for example, YEAR( ) MONTH( ) HOUR( ) and/or the like.

At 304, the query engine 110 may prune one or more partitions of the database table that are associated with a first time range that does not overlap with a second time range associated with the time based function. For example, the query engine 110 may evaluate the boundaries of each partition of the database table 150 to determine whether the time (or time range) defined by the time based functions are within the time (or time range) associated with each partition of the database table 150 such as, for example, the first range $R_1$ associated with the first partition 155a, the second range $R_2$ associated with the second partition 155b, the third range $R_3$ associated with the third partition 155c, and/or the like. As such, a partition may be pruned from the query if the query engine 110 detects an overlap between one or more boundaries of the partition and the time (or time range) defined by the time based functions included in the query. For instance, if the query includes the time based function YEAR(C1)=2015, the query engine 110 may prune the first partition 155a and the third partition 155c at least because the year 2015 overlaps with neither the first range $R_1$ covered by the first partition 155a nor the third range $R_3$ covered by the third partition 155c.

At 306, the query engine 110 may generate an execution plan for the query that avoids accessing the pruned partitions. In some example embodiments, the query engine 110 may generate an execution plan that includes a sequence of operations for executing the query at the database 120. By pruning the first partition 155a and the third partition 155c from the query, the query engine 110 may generate the execution plan to exclude the first partition 155a and the third partition 155c from the sequence of operations.

At 308, the query engine 110 may execute the query by at least performing a sequence of operations included in the execution plan. As noted, the query engine 110 may generate the execution plan to exclude, from the sequence of operations included in the execution plan, the first partition 155a and the third partition 155c pruned from the query. Accordingly, the query may be executed without accessing the first partition 155a stored at the first node 125a or the third partition 155c stored at the third node 125c. Instead, the query engine 110 may execute the query on the second partition 155b stored at the second node 125b of the database 120. Avoiding the first partition 155a and the third partition 155c may improve the computational speed and efficiency of the query at least because the data included in the first partition 155a and the third partition 155c are not required by the query.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

Example 2: The system of example 1, wherein the database table includes at least one column defined to store values having a time based datatype.

Example 3: The system of example 2, wherein the database table is range partitioned, based at least on the values store in the at least one column, into the first partition and the second partition.

Example 4: The system of any one of examples 2 to 3, wherein the second partition is not pruned from the query in response to determining that a third time range of the second partition overlaps with the second time range of the time based function.

Example 5: The system of any one of examples 2 to 4, wherein the second partition is not pruned from the query in response to determining that the second time range associated with the time based function overlaps with one or more partition boundaries of the second partition.

Example 6: The system of any one of examples 2 to 5, wherein the time based function is configured to select, from the database table, one or more rows based at least on the values occupying the at least one column.

Example 7: The system of example 6, wherein the time based function defines a time range comprising one or more years, months, or hours, and wherein the one or more rows are selected from the database table based at least on the values occupying the at least one column being within the time range.

Example 8: The system of any one of examples 1 to 7, wherein the first time range associated with the first partition comprises one or more years, months, and/or hours.

Example 9: The system of any one of examples 1 to 8, wherein the operations further include: generating an execution plan for the query, the execution plan including a sequence of operations that avoids accessing the first partition pruned from the query.

Example 10: The system of example 9, wherein the sequence of operations accesses a first node of a distributed database system storing a second partition of the database table but not a second node of the distributed database system storing the first partition of the database table.

Example 11: A method, comprising: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

Example 12: The method of example 11, wherein the database table includes at least one column defined to store values having a time based datatype.

Example 13: The method of example 12, wherein the database table is range partitioned, based at least on the values store in the at least one column, into the first partition and the second partition.

Example 14: The method of any one of examples 12 to 13, wherein the second partition is not pruned from the query in response to determining that a third time range of the second partition overlaps with the second time range of the time based function.

Example 15: The method of any one of examples 12 to 14, wherein the second partition is not pruned from the query in response to determining that the second time range associated with the time based function overlaps with one or more partition boundaries of the second partition.

Example 16: The method of any one of examples 12 to 15, wherein the time based function is configured to select, from the database table, one or more rows based at least on the values occupying the at least one column.

Example 17: The method of example 16, wherein the time based function defines a time range comprising one or more years, months, or hours, and wherein the one or more rows are selected from the database table based at least on the values occupying the at least one column being within the time range.

Example 18: The method of any one of examples 11 to 17, wherein the first time range associated with the first partition comprises one or more years, months, and/or hours.

Example 19: The method of any one of examples 11 to 18, wherein the operations further include: generating an execution plan for the query, the execution plan including a sequence of operations that avoids accessing the first partition pruned from the query, the sequence of operations accessing a first node of a distributed database system storing a second partition of the database table but not a second node of the distributed database system storing the first partition of the database table.

Example 20: A non-transitory computer readable medium storing instructions, which when executed by at least one data processor, result in operations comprising: evaluating a query on a database table to identify a time based function included in the query; pruning, from the query, a first partition of the database table associated with a first time range that does not overlap with a second time range associated with the time based function; and executing the query by at least accessing a second partition of the database table but not the first partition of the database table pruned from the query.

Figure 4:
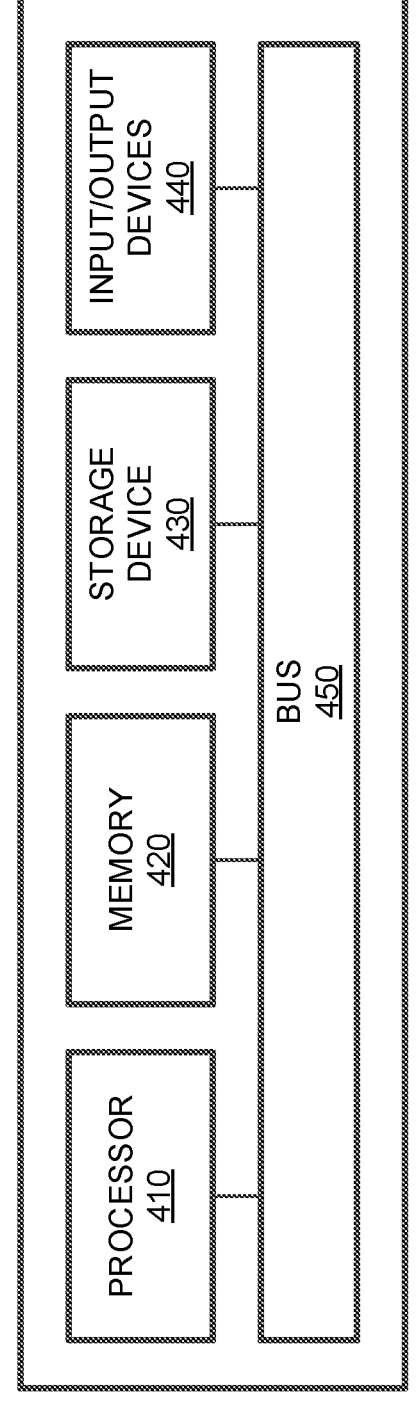
FIG. 4 depicts a block diagram illustrating a computing system, in accordance with some example embodiments.

FIG. 4 depicts a block diagram illustrating an example of a computing system 400 consistent with implementations of the current subject matter. Referring to FIGS. 1-4, the computing system 400 may implement the query engine 110 and/or any components therein.

As shown in FIG. 4, the computing system 400 can include a processor 410, a memory 420, a storage device 430, and input/output device 440. The processor 410, the memory 420, the storage device 430, and the input/output device 440 can be interconnected via a system bus 450. The processor 410 is capable of processing instructions for execution within the computing system 400. Such executed instructions can implement one or more components of, for example, the query engine 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, cause operations comprising:
   executing, at a distributed database, a statement including a definition of a database table,
   wherein the executing of the statement creates, based at least on the definition, the database table to include at least one column storing a time datatype,
   wherein the executing of the statement further includes partitioning, based at least on the definition, the database table into a plurality of partitions in accordance with a plurality of values occupying the at least one column storing the time datatype,
   wherein the plurality of partitions includes a first partition including at least a first row from the database table in which a first value in the at least one column is within a first time range, a second partition including at least a second row from the database table in which a second value in the at least one column is within a second time range following the first time range, and a third partition including at least 1) a third row from the database table in which a third value in the at least one column is within a third time range preceding the first time range and 2) a fourth row from the database table in which a fourth value in the at least one column is within a fourth time range following the second time range, such that the third partition includes rows from the database table in which values in the at least one column are within neither the first time range nor the second time range,
   wherein the first partition is stored at a first node of the distributed database, the second partition is stored at a second node of the distributed database, and the third partition is stored at a third node of the distributed database;
   evaluating a query on the database table to identify a time based function included in the query;
   in response to the query including the time based function, pruning, from the query, the first partition of the database table based at least on the first time range of the first partition not overlapping with a time of the time based function, and pruning, from the query, the third partition of the database table based at least on the third and fourth time ranges of the third partition not overlapping with the time of the time based function;
   generating an execution plan for the query, the execution plan including a sequence of operations that avoids accessing the first partition and the third partition both of which being pruned from the query, wherein the sequence of operations accesses the second node storing the second partition but avoids access to the first node storing the first partition and the third node storing the third partition; and executing the execution plan for the query by at least accessing the second partition stored at the second node but not the first partition stored at the first node and the third partition stored at the third node.

2. The system of claim 1, wherein the second partition is not pruned from the query in response to determining that the second time range of the second partition overlaps with the time of the time based function.

3. The system of claim 1, wherein a fourth partition is not pruned from the query in response to determining that the time of the time based function overlaps with one or more partition boundaries of the fourth partition.

4. The system of claim 1, wherein the time based function is configured to select, from the database table, one or more rows based at least on the plurality of values occupying the at least one column.

5. The system of claim 4, wherein the time based function defines a time range comprising one or more years, months, or hours, and wherein the one or more rows are selected from the database table based at least on a corresponding value occupying the at least one column being within the time range.

6. The system of claim 1, wherein the first time range associated with the first partition and the second time range associated with the second partition each comprise one or more years, months, and/or hours.

7. A computer-implemented method, comprising:
executing, at a distributed database, a statement including a definition of a database table,
wherein the executing of the statement creates, based at least on the definition, the database table to include at least one column storing a time datatype,
wherein the executing of the statement further includes partitioning, based at least on the definition, the database table into a plurality of partitions in accordance with a plurality of values occupying the at least one column storing the time datatype,
wherein the plurality of partitions includes a first partition including at least a first row from the database table in which a first value in the at least one column is within a first time range, a second partition including at least a second row from the database table in which a second value in the at least one column is within a second time range following the first time range, and a third partition including at least 1) a third row from the database table in which a third value in the at least one column is within a third time range preceding the first time range and 2) a fourth row from the database table in which a fourth value in the at least one column is within a fourth time range following the second time range, such that the third partition includes rows from the database table in which values in the at least one column are within neither the first time range nor the second time range,
wherein the first partition is stored at a first node of the distributed database, the second partition is stored at a second node of the distributed database, and the third partition is stored at a third node of the distributed database;
evaluating a query on the database table to identify a time based function included in the query;
in response to the query including the time based function, pruning, from the query, the first partition of the database table based at least on the first time range of the first partition not overlapping with a time of the time based function, and pruning, from the query, the third partition of the database table based at least on the third and fourth time ranges of the third partition not overlapping with the time of the time based function;

generating an execution plan for the query, the execution plan including a sequence of operations that avoids accessing the first partition and the third partition both of which being pruned from the query, wherein the sequence of operations accesses the second node storing the second partition but avoids access to the first node storing the first partition and the third node storing the third partition; and executing the execution plan for the query by at least accessing the second partition stored at the second node but not the first partition stored at the first node and the third partition stored at the third node.

8. The method of claim 7, wherein the second partition is not pruned from the query in response to determining that the second time range of the second partition overlaps with the time of the time based function.

9. The method of claim 7, wherein a fourth partition is not pruned from the query in response to determining that the time of the time based function overlaps with one or more partition boundaries of the fourth partition.

10. The method of claim 7, wherein the time based function is configured to select, from the database table, one or more rows based at least on the plurality of values occupying the at least one column.

11. The method of claim 10, wherein the time based function defines a time range comprising one or more years, months, or hours, and wherein the one or more rows are selected from the database table based at least on a corresponding value occupying the at least one column being within the time range.

12. The method of claim 7, wherein the first time range associated with the first partition and the second time range associated with the second partition each comprise one or more years, months, and/or hours.

13. A non-transitory computer readable medium storing instructions, which when executed by at least one data processor, result in operations comprising:

executing, at a distributed database, a statement including a definition of a database table, wherein the executing of the statement creates, based at least on the definition, the database table to include at least one column storing a time datatype, wherein the executing of the statement further includes partitioning, based at least on the definition, the database table into a plurality of partitions in accordance with a plurality of values occupying the at least one column storing the time datatype, wherein the plurality of partitions includes a first partition including at least a first row from the database table in which a first value in the at least one column is within a first time range, a second partition including at least a second row from the database table in which a second value in the at least one column is within a second time range following the first time range, and a third partition including at least 1) a third row from the database table in which a third value in the at least one column is within a third time range preceding the first time range and 2) a fourth row from the database table in which a fourth value in the at least one column is within a fourth time range following the second time range, such that the third partition includes rows from the database table in which values in the at least one column are within neither the first time range nor the second time range, wherein the first partition is stored at a first node of the distributed database, the second partition is stored at a second node of the distributed database, and the third partition is stored at a third node of the distributed database;

evaluating a query on the database table to identify a time based function included in the query;

in response to the query including the time based function, pruning, from the query, the first partition of the database table based at least on the first time range of the first partition not overlapping with a time of the time based function, and pruning, from the query, the third partition of the database table based at least on the third and fourth time ranges of the third partition not overlapping with the time of the time based function;

generating an execution plan for the query, the execution plan including a sequence of operations that avoids accessing the first partition and the third partition both of which being pruned from the query, wherein the sequence of operations accesses the second node storing the second partition but avoids access to the first node storing the first partition and the third node storing the third partition; and executing the execution plan for the query by at least accessing the second partition stored at the second node but not the first partition stored at the first node and the third partition stored at the third node.

* * * * *